United States Patent [19]
Lin et al.

[11] Patent Number: 6,105,735
[45] Date of Patent: Aug. 22, 2000

[54] BRAKE DEVICE FOR A BICYCLE

[76] Inventors: Ah-Ping Lin, No. 20, Lane 666, Sec. 2, Chung-Cheng Rd.; Jung-Hua Li, No. 9, Lane 300, Hsiao-Yang Rd., both of Chang-Hua City, Taiwan

[21] Appl. No.: 09/238,848

[22] Filed: Jan. 28, 1999

[51] Int. Cl.$^7$ ...................................................... B62L 1/08
[52] U.S. Cl. ................ 188/73.1; 188/24.12; 188/250 G; 188/250 B; 188/261
[58] Field of Search .............................. 188/24.11–24.22, 188/73.1, 250 B, 250 G, 250 A, 234, 250 E, 251 R, 250 R, 261, 73.37; 192/70.14, 107 M, 107 R, 30 V, 113.36, 52.1, 52.3, 52.2

[56] References Cited

U.S. PATENT DOCUMENTS

| | | | |
|---|---|---|---|
| 1,462,391 | 7/1923 | Stokes | 188/250 B |
| 2,516,544 | 7/1950 | Breeze | 192/52.1 |
| 3,305,048 | 2/1967 | Brilando | 188/24.12 |
| 5,168,962 | 12/1992 | Yoshigai | 188/24.12 |

FOREIGN PATENT DOCUMENTS

| | | | |
|---|---|---|---|
| 2640337 | 6/1990 | France | 188/250 G |
| 2242877 | 3/1974 | Germany | 188/250 G |
| 2611078 | 9/1977 | Germany | 188/73.1 |
| 3015765 | 10/1981 | Germany | 188/73.1 |
| 706216 | 3/1966 | Italy | 188/73.1 |

Primary Examiner—Douglas C. Butler
Attorney, Agent, or Firm—Trop, Pruner & Hu, P.C.

[57] ABSTRACT

A brake device includes a shoe holder, and a brake shoe held by the shoe holder. The brake shoe has a plurality of outwardly projecting brake parts, a plurality of grooves each of which is formed between two adjacent ones of the brake parts and each of which is defined by a pair of groove walls, a plurality of flat contact faces formed on the brake parts, respectively, and spaced apart by the grooves, and a pair of buffer faces formed at two opposite ends of each of the contact faces to connect each of the contact faces to two adjacent ones of the groove walls. Each of the buffer faces extends inwardly of the corresponding one of the contact faces.

1 Claim, 13 Drawing Sheets

BRAKE DEVICE FOR A BICYCLE

BACKGROUND OF THE INVENTION

1. Field of the Invention

This invention relates to a brake device for bicycle, more particularly to a brake shoe for braking bicycle.

2. Description of the Related Art

FIGS. 1 and 2 illustrate a conventional brake device 10 which includes an elongated rubber brake shoe 11, and a metal connecting rod 12 fixed perpendicularly at the middle of one side of the rubber brake shoe 11. The rubber brake shoe 11 has a plurality of grooves 111 at intervals, each of which is defined by a pair of opposing groove walls 115, and a plurality of contact faces 112 spaced apart by the grooves 111. Each contact face 112 has a planar surface. The planar surface of each contact face 112 abuts completely against a wheel rim 13 when the rubber brake shoe 11 is operated to press against the wheel rim 13. Thus, a braking effect can be easily obtained from the brake device 10. However, because the planar surface completely contacts the wheel rim 13 upon braking, the wheel may immediately reach dead-lock, causing the bicycle to overturn. Furthermore, as the contact faces 112 are elastic, upon braking, they will deform and vibrate between their original position and a position shown by phantom lines in FIG. 3.

FIGS. 4 and 5 illustrate another conventional brake device 20 for overcoming the above-mentioned problem of immediate dead-lock action. The brake device 20 includes an elongated rubber brake shoe 23 having one side inserted into a shoe holder 21 and fixed thereon by screw means 211. A connecting rod 22 is secured on the shoe holder 21 and is perpendicular to the rubber brake shoe 23. The rubber brake shoe 23 has a plurality of grooves 231 disposed at intervals on the other side of the rubber brake shoe 23, and a plurality of inclined contact faces 232 spaced apart by the grooves 231. Each of the inclined contact faces 232 has a tip portion 233 at one end of the contact face 232. The tip portion 233 of the inclined contact face 232 first contacts the wheel rim 24 upon braking, and afterwards, the following portion of each inclined contact face 232 gradually contacts the wheel rim 24 by the continued braking action. The brake device 20 can gradually brake the wheel without causing the bicycle suddenly moving into a dead-lock position and overturn. However, like the upper edges 113 of the brake shoe 11 shown in FIGS. 1 and 2, the tip portions 233 can be trailed and vibrated by the forwardly moving wheel rim 24 shown in FIGS. 6 and 7, thereby generating uncomfortable noise.

SUMMARY OF THE INVENTION

Therefore, it is an object of the present invention to provide a brake device for a bicycle that is capable of eliminating the above-mentioned dead-lock and noise problems.

Accordingly, the brake device of the present invention comprises: a shoe holder; and a brake shoe held by the shoe holder. The brake shoe includes a plurality of outwardly projecting brake parts, a plurality of grooves each of which is formed between two adjacent ones of the brake parts and each of which is defined by a pair of groove walls, a plurality of flat contact faces formed on the brake parts, respectively, and spaced apart by the grooves, and a pair of buffer faces formed at two opposite ends of each of the contact faces to connect each of the contact faces to two adjacent ones of the groove walls. Each of the buffer faces extends inwardly of the corresponding one of the contact faces.

BRIEF DESCRIPTION OF THE DRAWINGS

In drawings which illustrate embodiments of the invention.

DETAILED DESCRIPTION OF THE PREFERRED EMBODIMENTS

Figure 1:
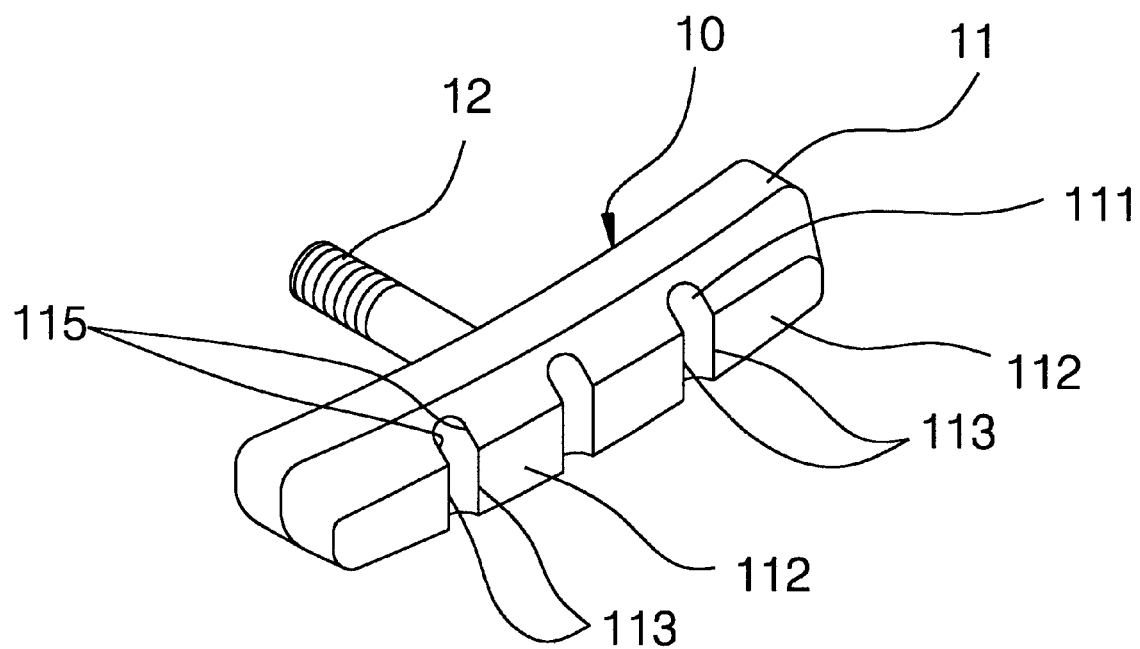
FIG. 1 is a perspective view of a conventional brake device.
Figure 2:
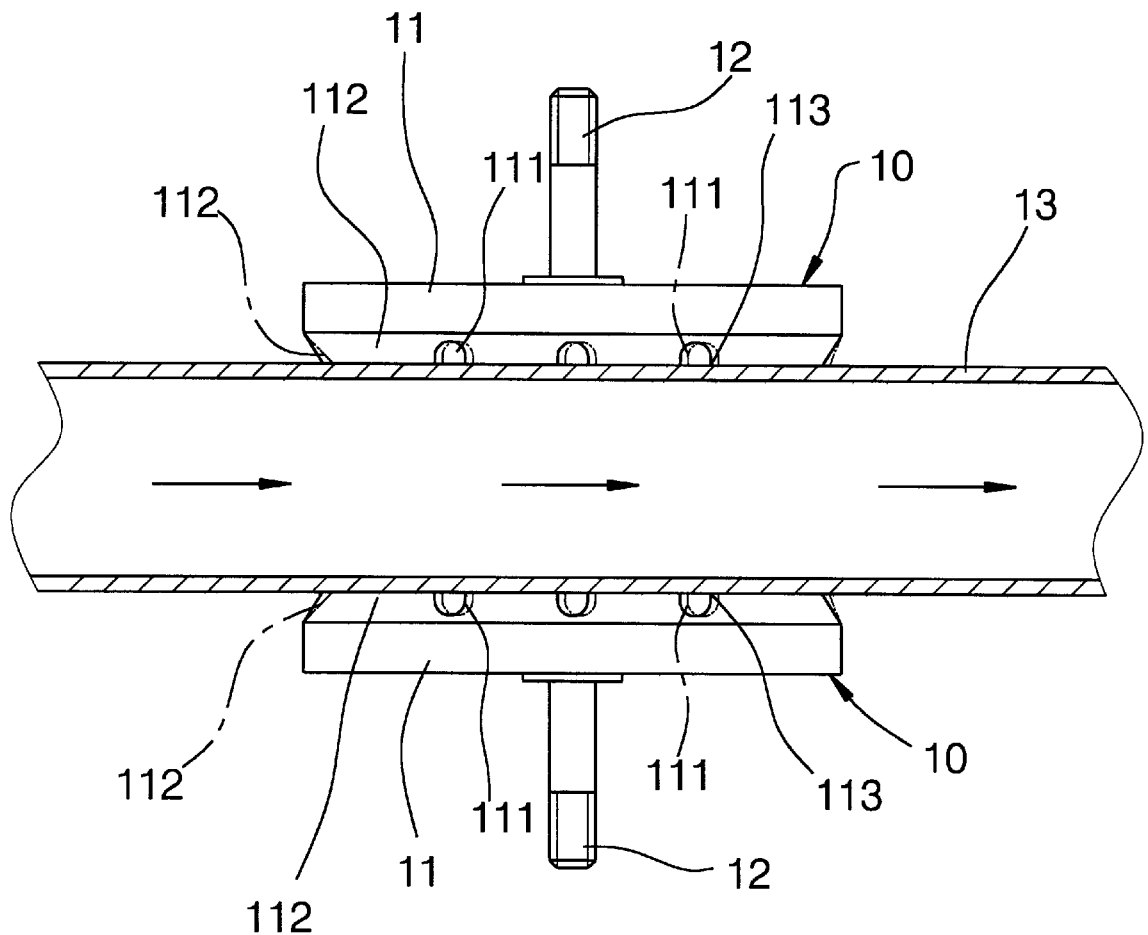
FIG. 2 is a schematic view of the brake device of FIG. 1 in contact with a segment of a wheel rim under a braking condition.
Figure 3:
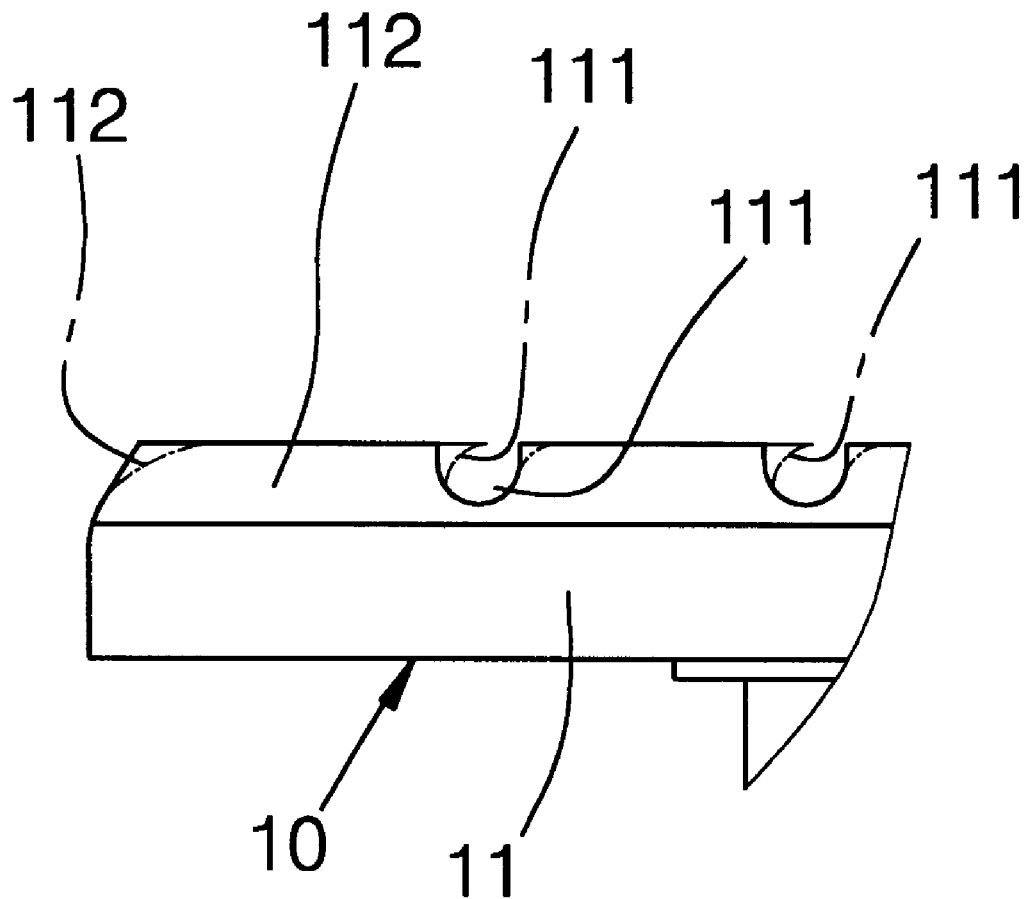
FIG. 3 is an enlarged view showing how contact faces of the brake device of FIG. 1 vibrate upon braking.
Figure 4:
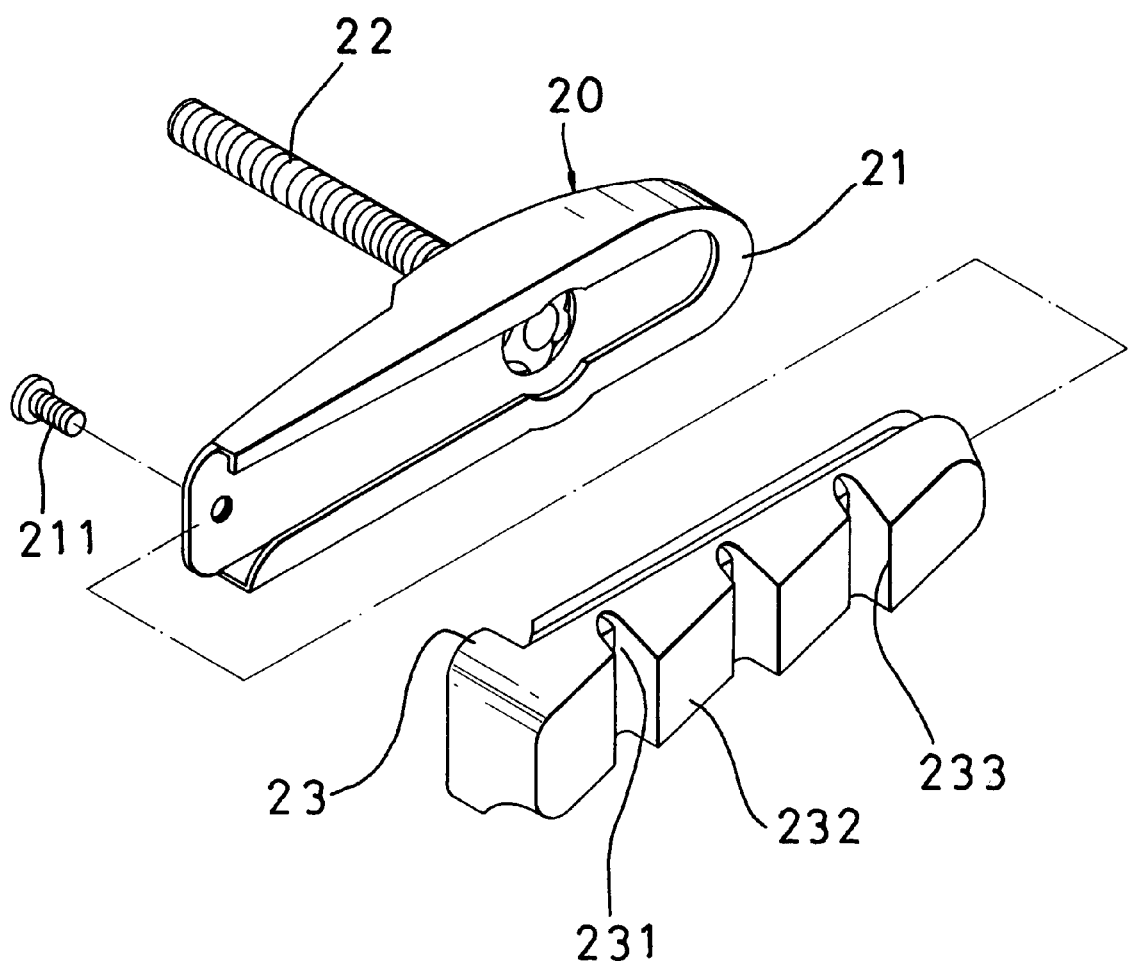
FIG. 4 is an exploded perspective view of another conventional brake device.
Figure 5:
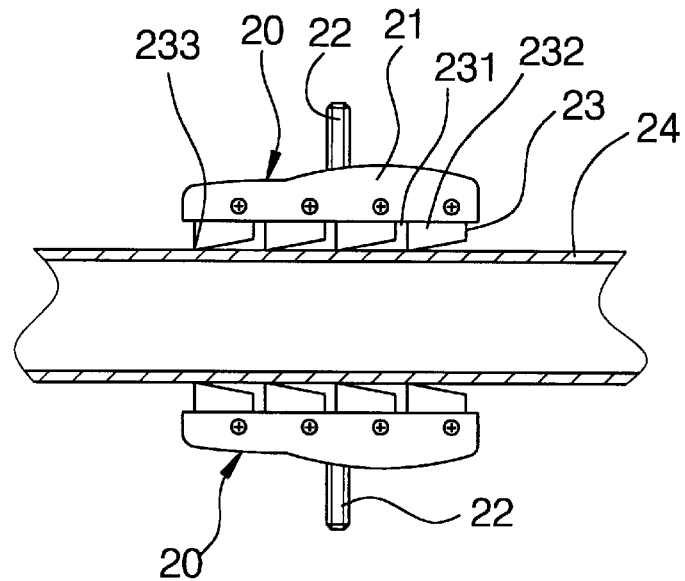
FIG. 5 is a schematic view of the brake device of FIG. 4 in an initial stage of contact with a segment of a wheel rim upon braking.
Figure 6:
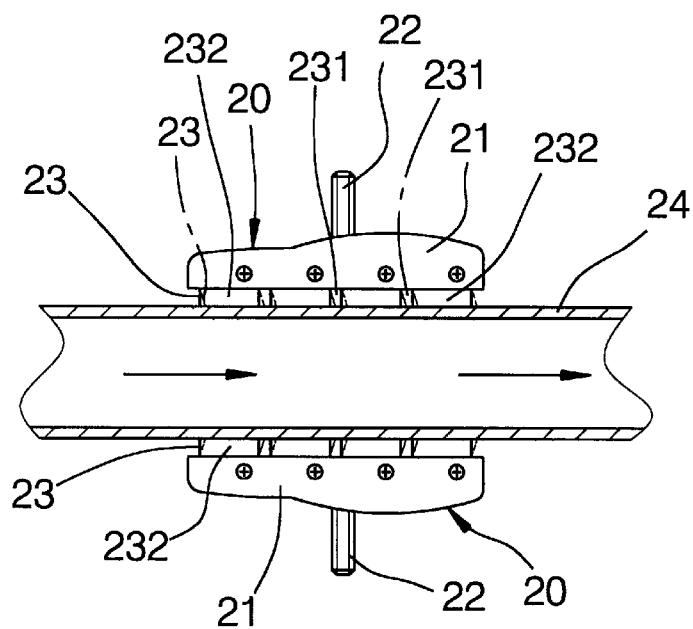
FIG. 6 is a schematic view of the brake device of FIG. 4 in complete contact with the segment of the wheel rim upon braking.
Figure 7:
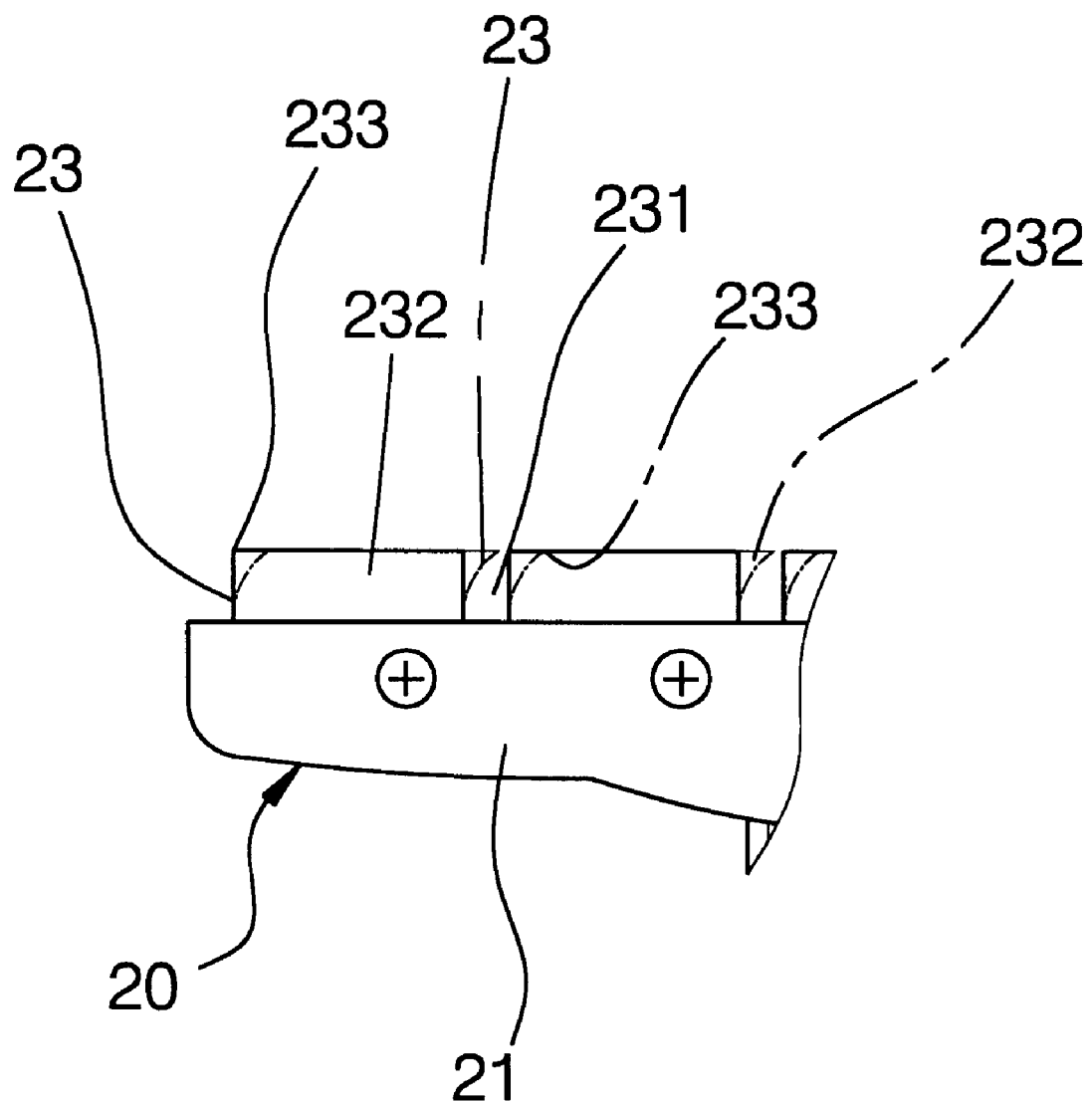
FIG. 7 is an enlarged view showing how inclined contact faces of the brake device of FIG. 4 vibrate upon braking.
Figure 8:
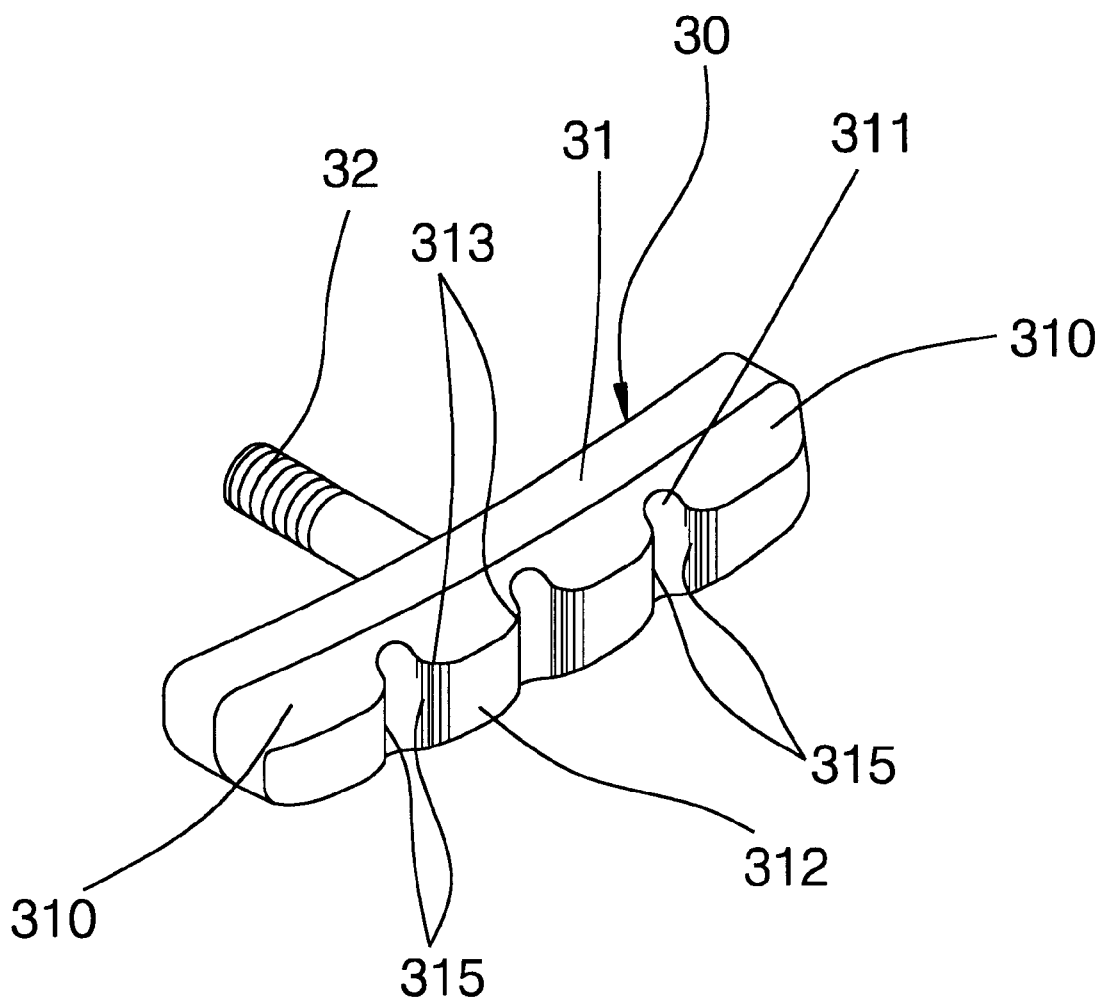
FIG. 8 is a perspective view of a brake device according to the first embodiment of this invention.
Figure 9:
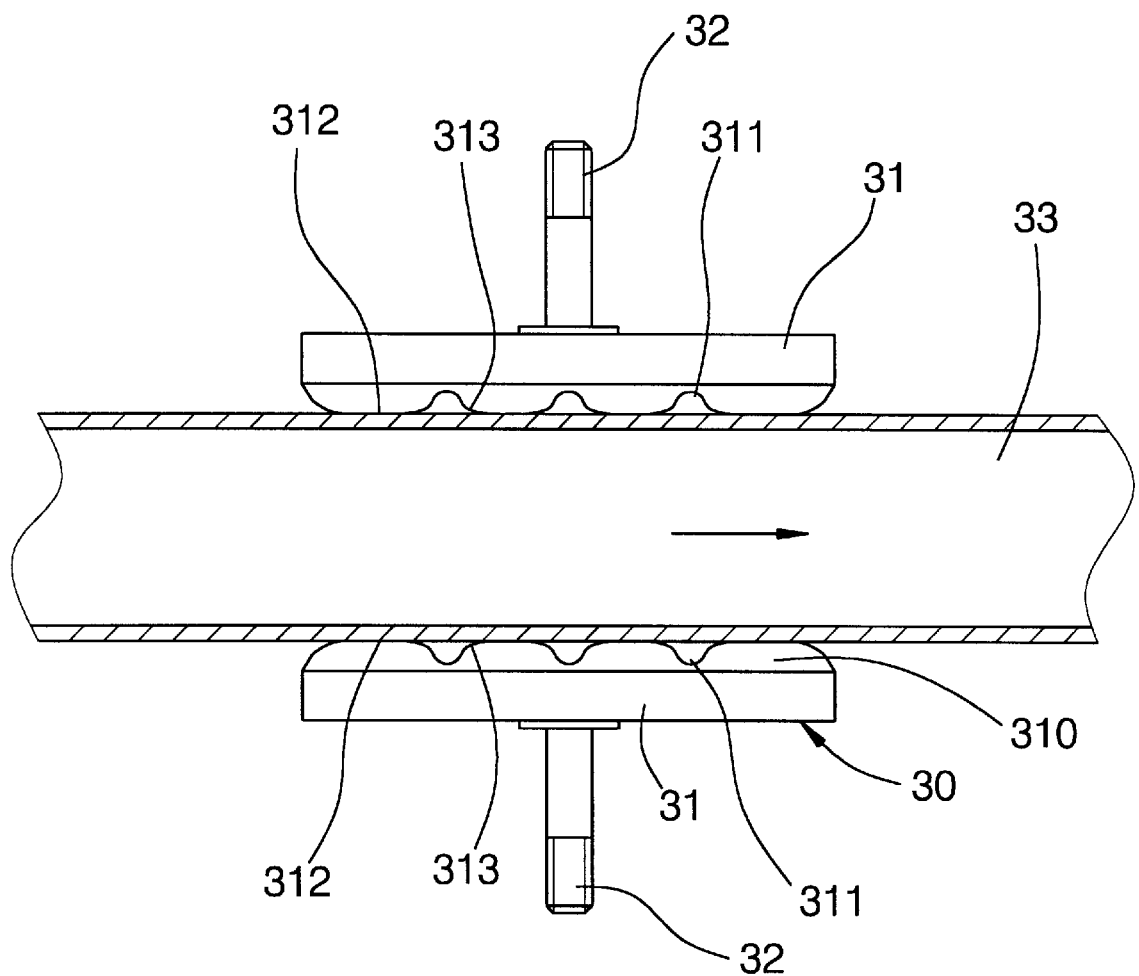
FIG. 9 is a schematic view of the brake device of FIG. 8 in contact with a segment of a wheel rim upon braking.

FIGS. 8 and 9 illustrate a first embodiment of a brake device 30 of this invention. The brake device 30 includes an elongated rubber brake shoe 31 held by a shoe holder or metal connecting rod 32. The brake shoe 31 has a plurality of outwardly projecting brake parts 310, a plurality of grooves 311 formed at intervals, and a plurality of flat contact faces 312 formed on the brake parts 310 and spaced apart by the grooves 311. Each of the grooves 311 is defined by a pair of opposing groove walls 315.

A pair of buffer faces 313 are formed at two opposing ends of each contact face 312 to connect each of the contact faces 312 to two adjacent ones of the groove walls 315. Each buffer face 313 extends inwardly of the corresponding contact face 312, and is inclined with respect to the corresponding contact face 312 and the corresponding groove wall 315. Preferably, the buffer faces 313 are convex in shape in this embodiment. Alternatively, they may be inclined flat surfaces.

Figure 10:
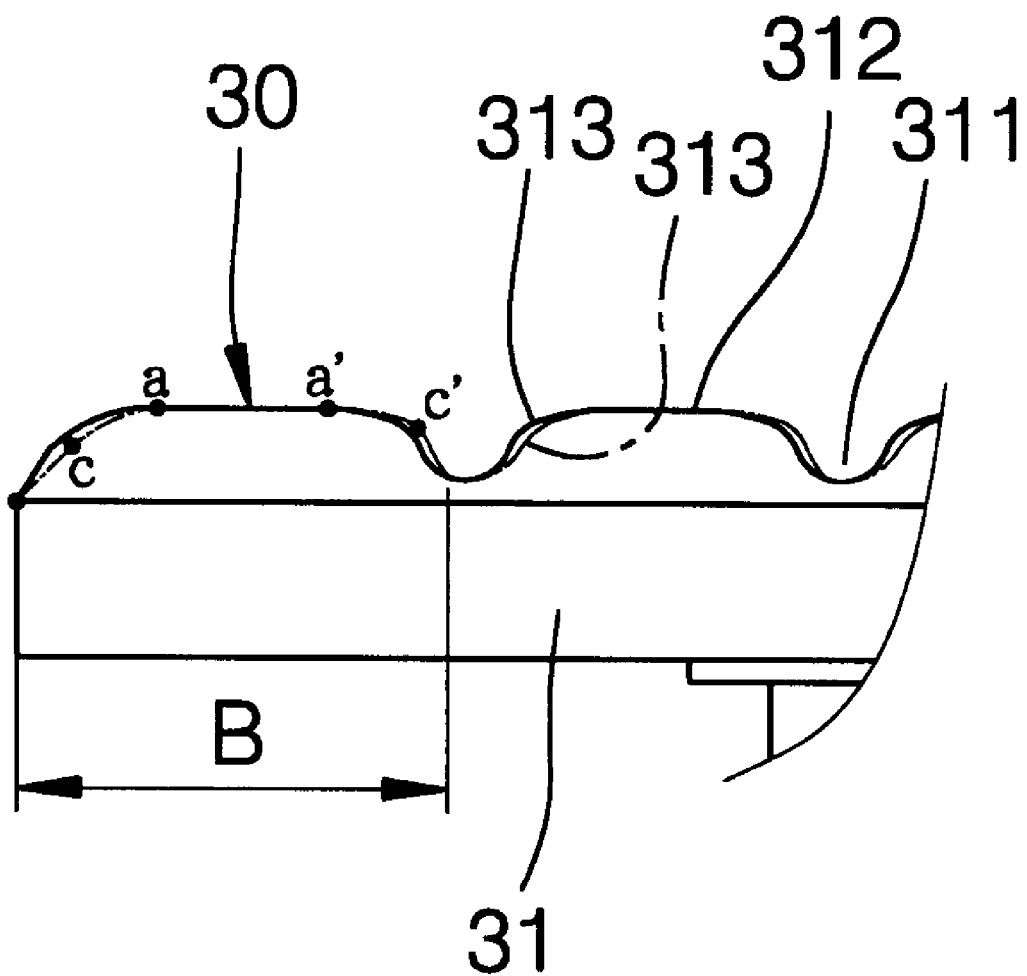
FIG. 10 is a schematic view of the brake device of FIG. 8 in a deformed state upon braking.

In operation, the contact faces 312 (from point a to a' shown in FIG. 10) first contact a wheel rim 33 upon braking. As the brake device 30 is further pressed against the wheel rim 33, the buffer faces 313 are forced to gradually contact the wheel rim 33. Thus, the brake shoe 31 has an increased contact region with a length from point c to c' as shown in FIG. 10. Since the brake shoe 31 starts to contact the wheel rim 33 at the contact faces 312 only, the initial contact area is less, thereby buffering the braking action and eliminating the immediate dead-lock action. In the buffer faces 313, there are no edges or parts that can be trailed by the wheel rim 33 upon contact. Although, the contact faces 312 will deform, upon braking, relative to root part formed in region B between each two adjacent grooves 311, as shown in FIG. 10, no significant vibration and noise occur.

Figure 11:
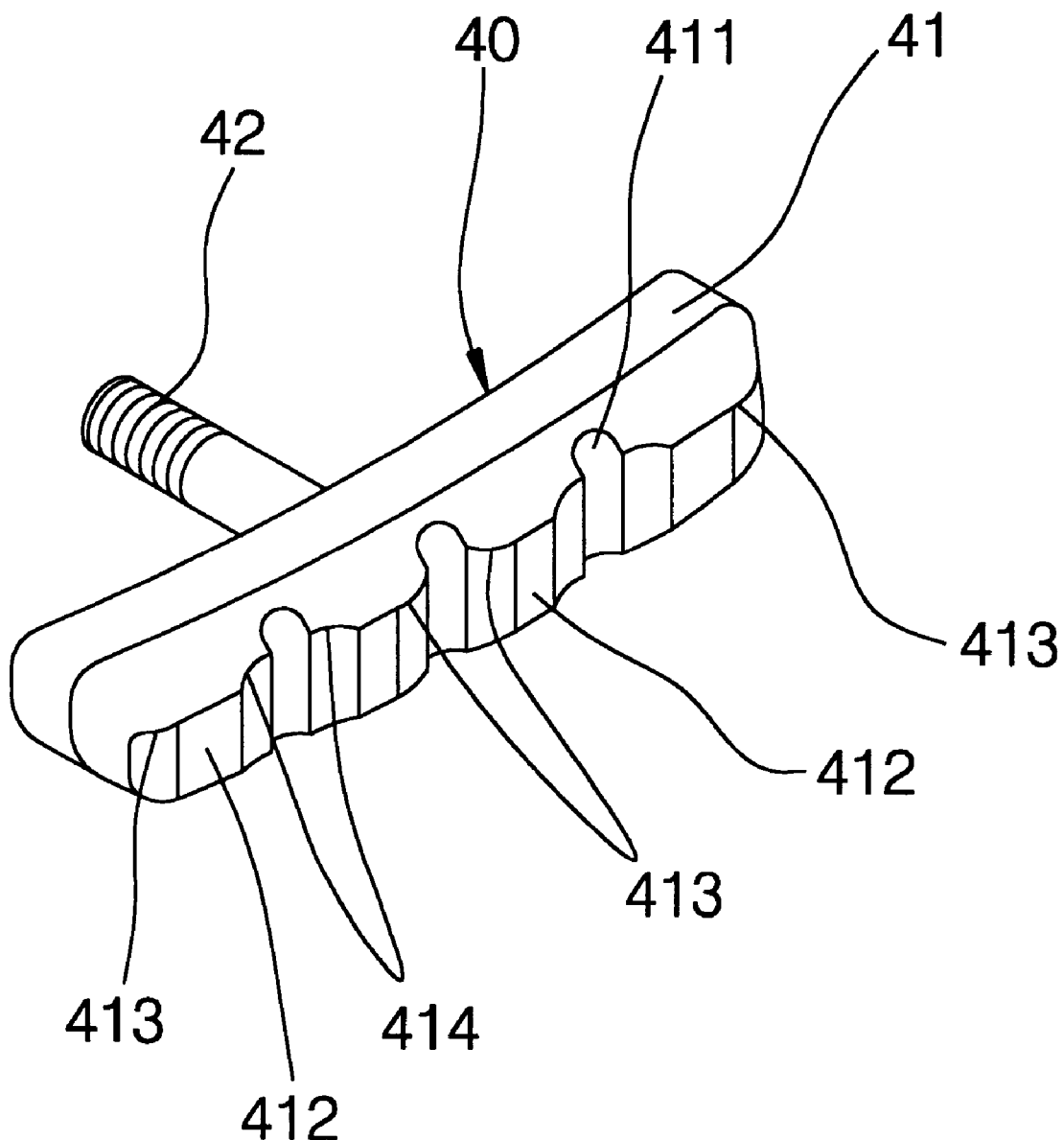
FIG. 11 is a perspective view of a brake device according to the second embodiment of this invention.
Figure 12:
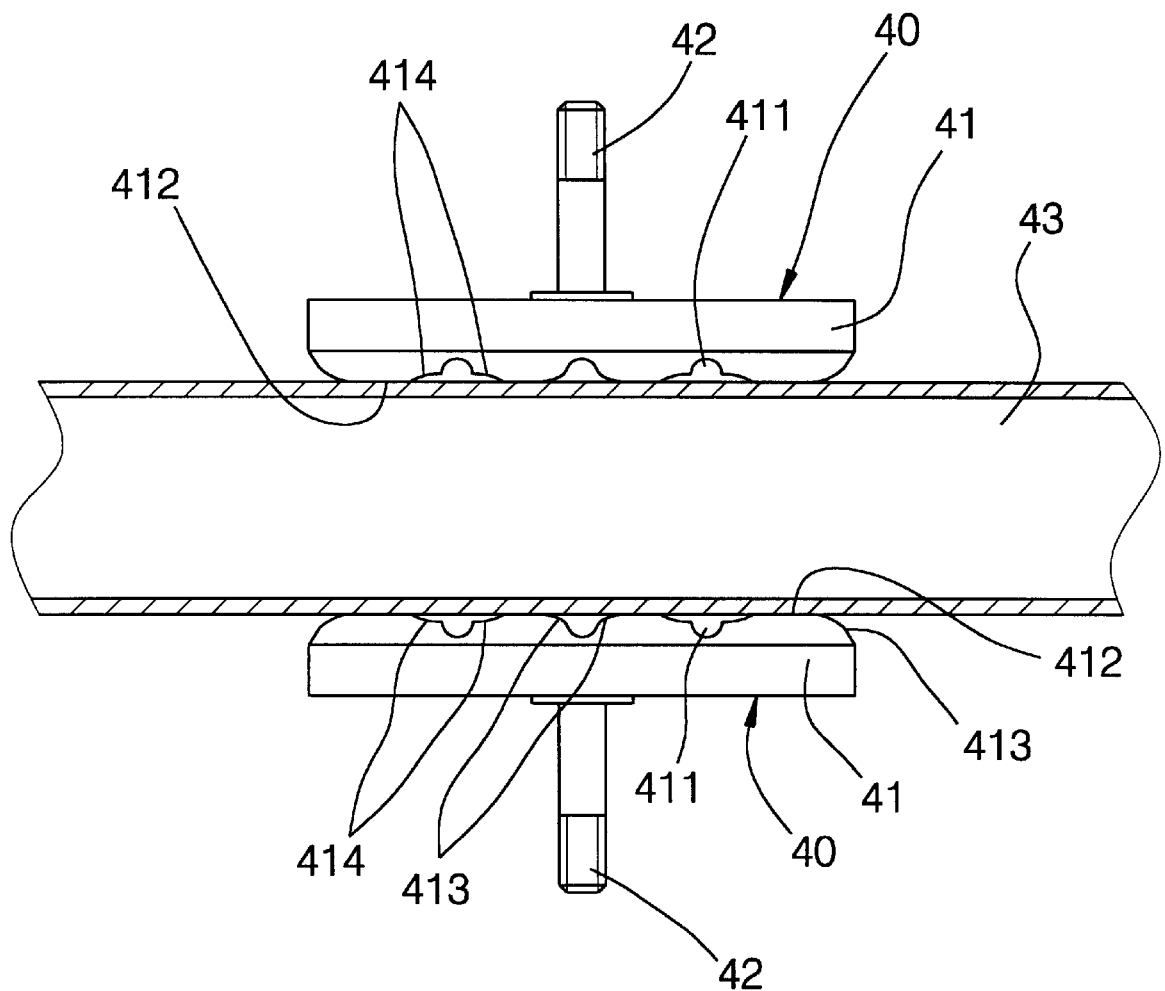
FIG. 12 is a schematic view of the brake device of FIG. 11 in contact with a segment of a wheel rim upon braking.

FIGS. 11 and 12 illustrate a second embodiment of the brake device of this invention. The brake device 40 includes a rubber brake shoe 41 held by a metal connecting rod 42. The rubber brake shoe 41 has a plurality of grooves 411, flat contact faces 412, and buffer faces 413, 414. The brake shoe 41 is substantially similar to the rubber brake shoe 31 of the first embodiment, except that the buffer face 413 at one end of each contact face 412 is convex, whereas the buffer face 414 at the other end of each contact face 412 is concave.

Figure 13:
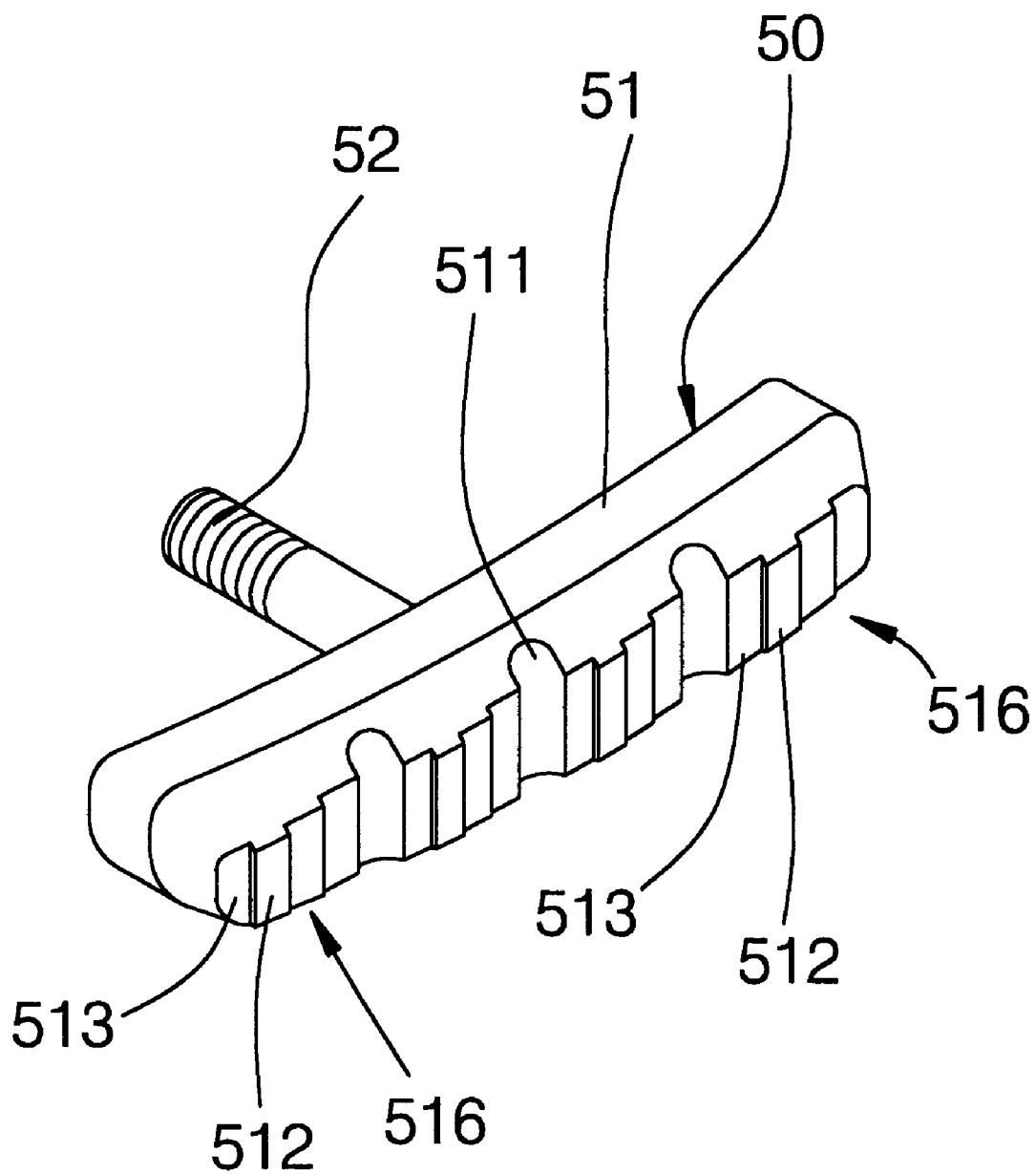
FIG. 13 is a perspective view of a brake device according to the third embodiment of this invention.
Figure 14:
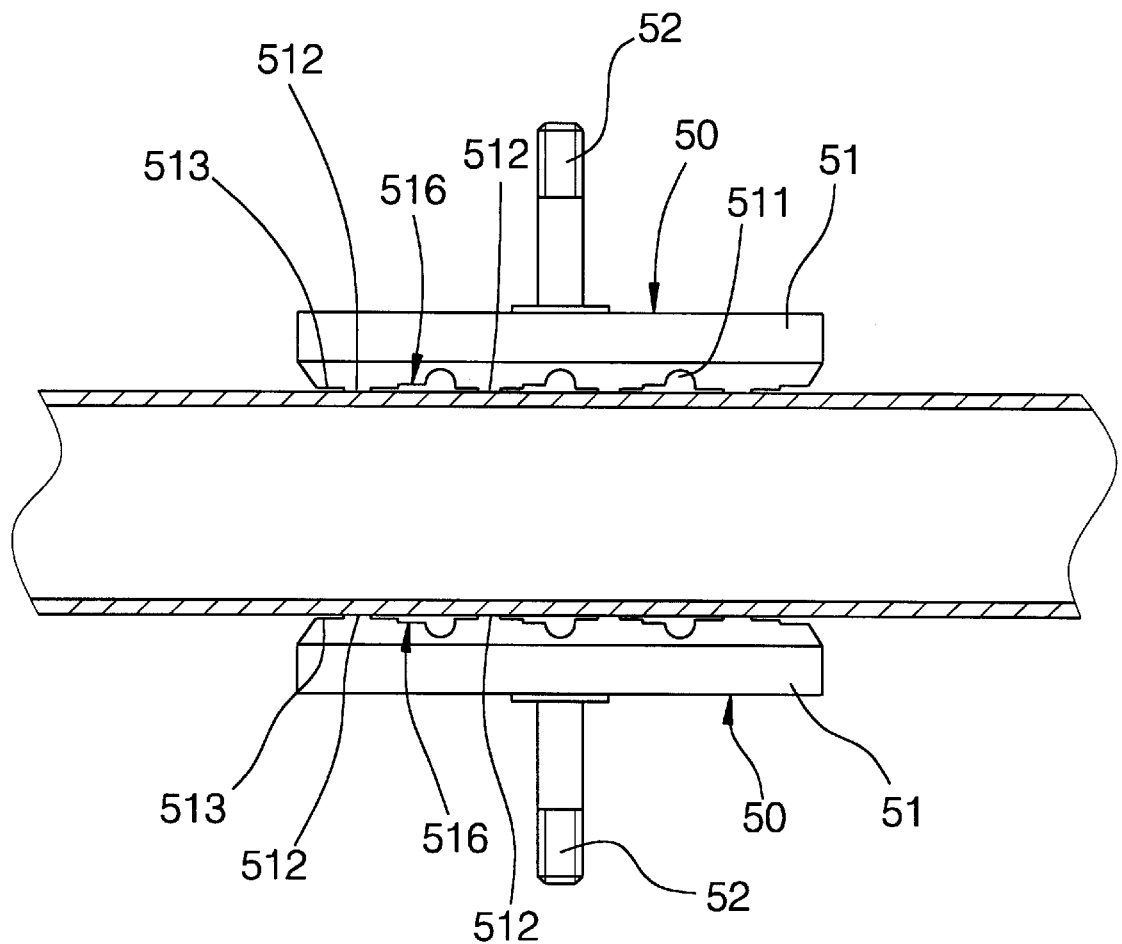
FIG. 14 is a schematic view of the brake device of FIG. 13 in contact with a segment of a wheel rim upon braking.

FIGS. 13 and 14 illustrate a third embodiment of the brake device of this invention. The brake device 50 includes a rubber brake shoe 51 held by a metal connecting rod 52. The rubber brake shoe 51 has a plurality of grooves 511 and flat contact faces 512, like the rubber brake shoe 31 of the first embodiment. However in the third embodiment, stepped buffer faces 513, 516 are formed at two opposite ends of each contact face 512. Each buffer face 513 has a single step. Each buffer face 516 has two steps. The buffer faces 516 are longer than the buffer faces 513.

With the invention thus explained, it is apparent that various modifications and variations can be made without departing from the spirit of the present invention. It is therefore intended that the invention be limited only as recited in the appended claims.

What is claimed is:

1. A brake device for braking a wheel of a bicycle comprising:

a shoe holder; and an elongated brake shoe held by said shoe holder said brake shoe having a plurality of outwardly projecting brake parts which are spaced apart longitudinally, and a plurality of grooves each of which is formed between two adjacent ones of said brake parts and each of which is defined by a pair of groove walls, each of said brake parts having a flat contact face, and a pair of curved faces formed at two opposite ends of said flat contact face, each of said curved faces having one end immediately connected to the respective one of said flat contact faces and gradually extending away from and inwardly of the plane of said flat contact face, and further having another end connected to said groove wall of the respective one of said grooves, each of said curved faces being initially curved away from said flat face with a small distance so that no corner edge is formed between said flat contact face and the respective one of said groove walls.

\* \* \* \* \*